Jan. 29, 1963            A. C. KING            3,075,252
PORTABLE BLIND FOR HUNTERS AND SOLDIERS
Filed Aug. 12, 1957            4 Sheets-Sheet 3
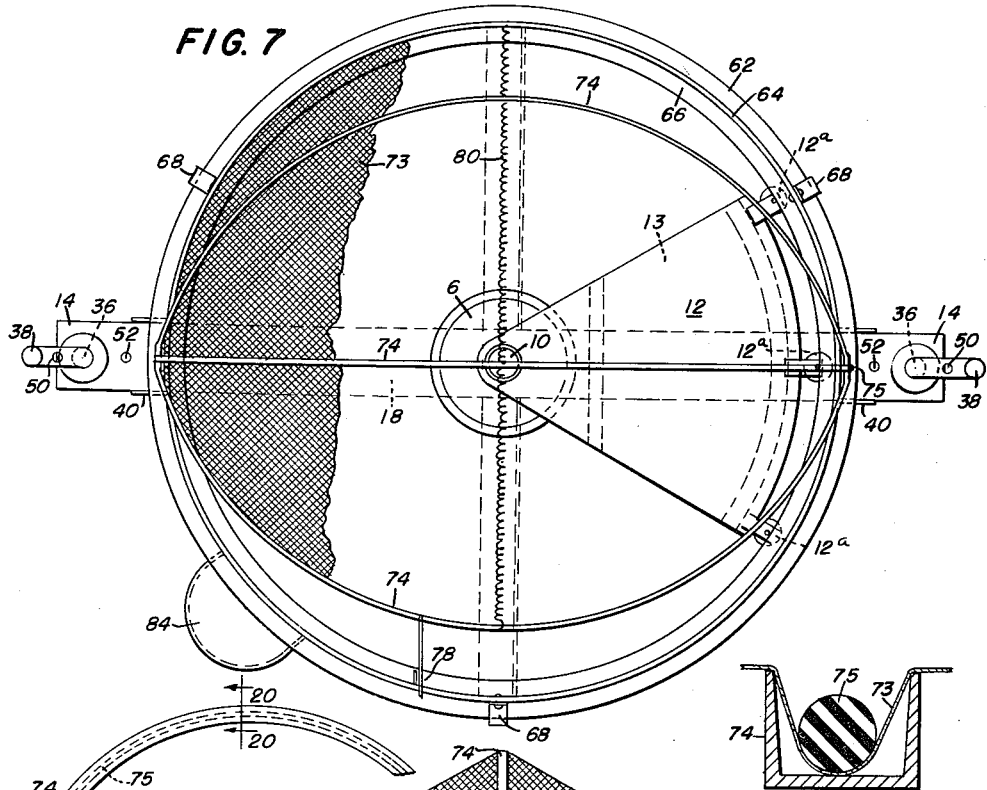
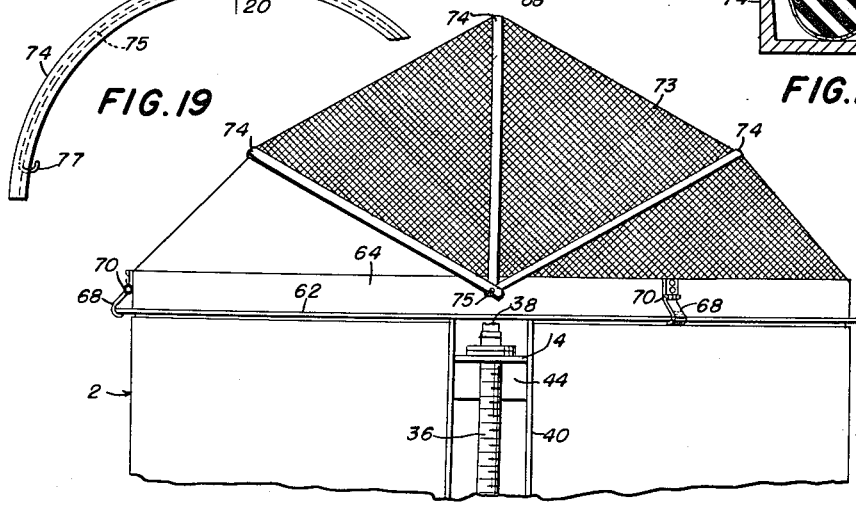
INVENTOR
ADOLPH C. KING
BY *Fisher & Christen*,
ATTORNEYS Jan. 29, 1963 A. C. KING 3,075,252
PORTABLE BLIND FOR HUNTERS AND SOLDIERS
Filed Aug. 12, 1957 4 Sheets-Sheet 4
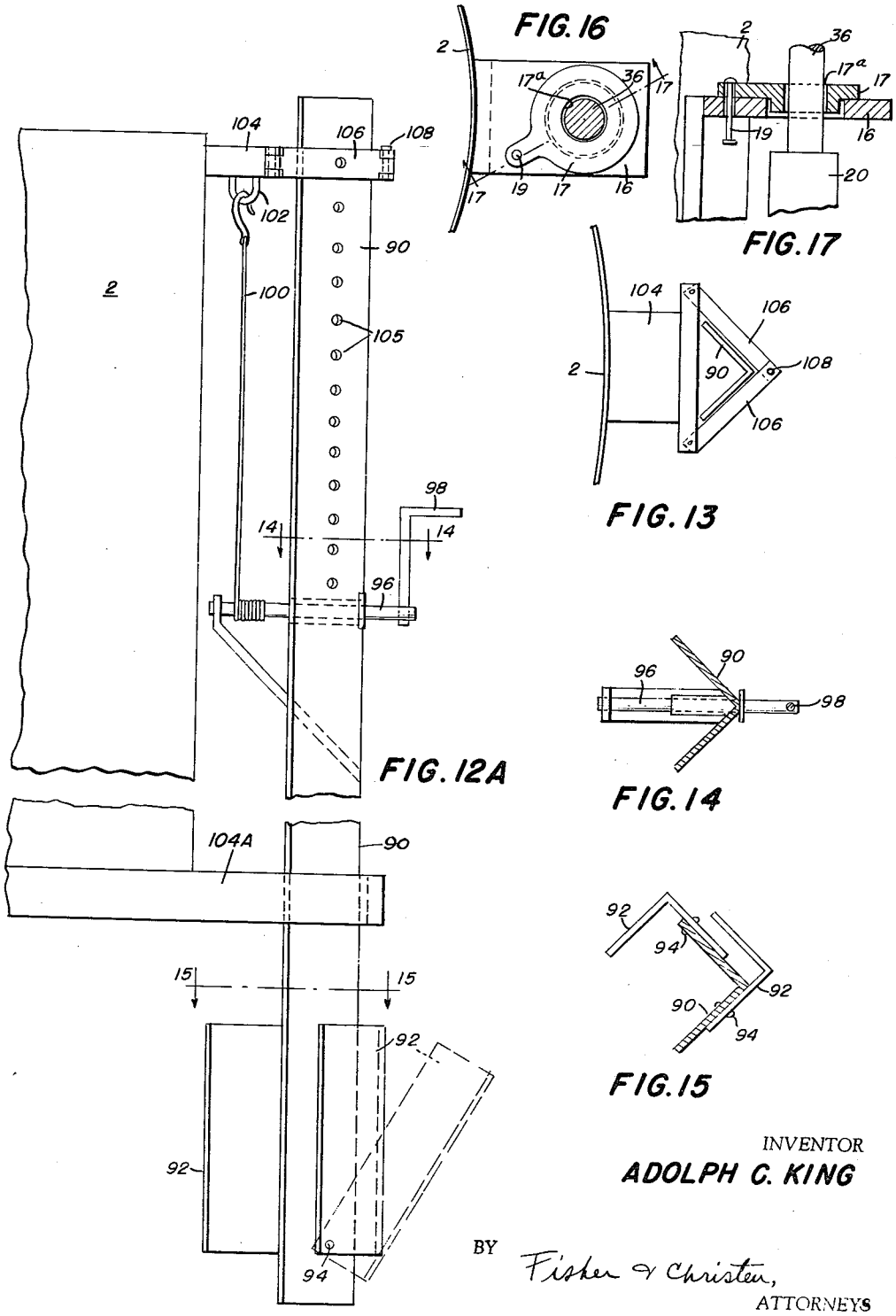
INVENTOR
ADOLPH C. KING
BY Fisher & Christen,
ATTORNEYS

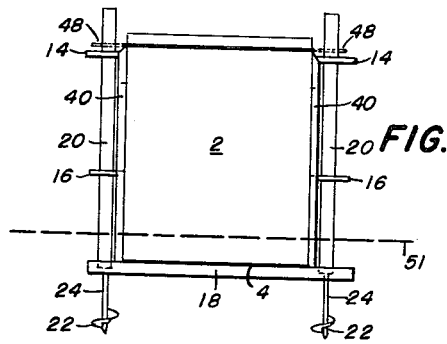
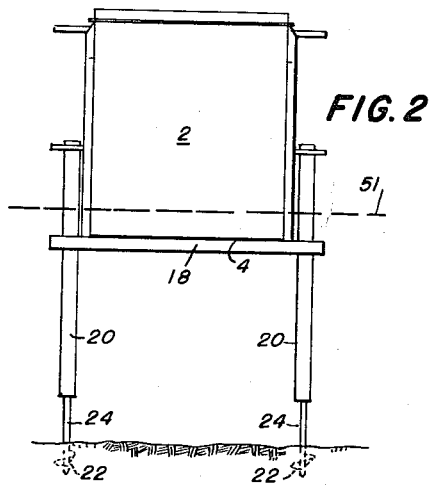
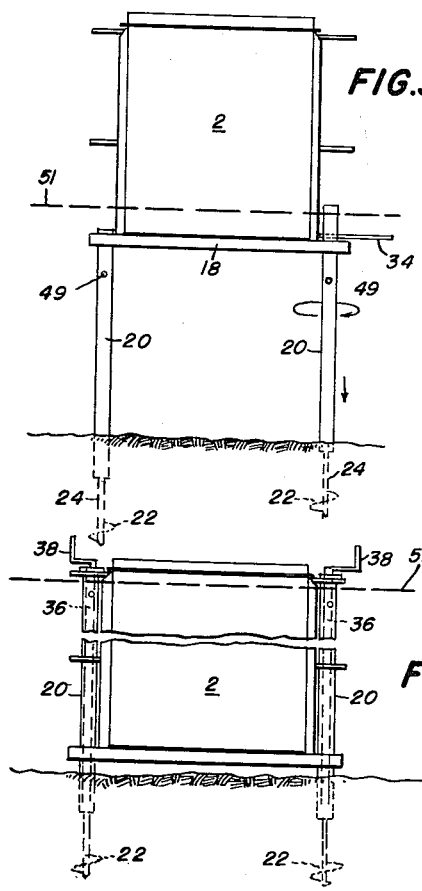
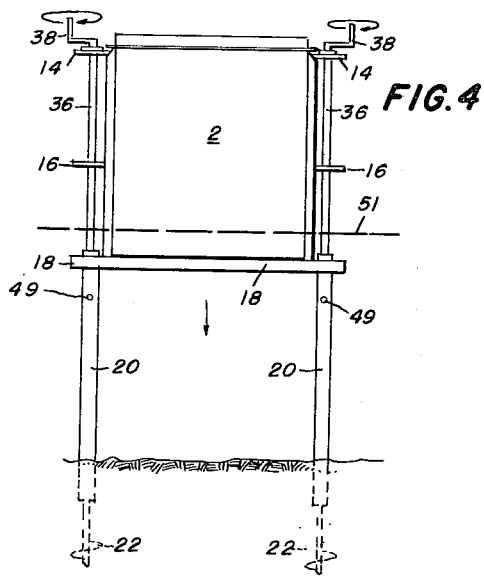

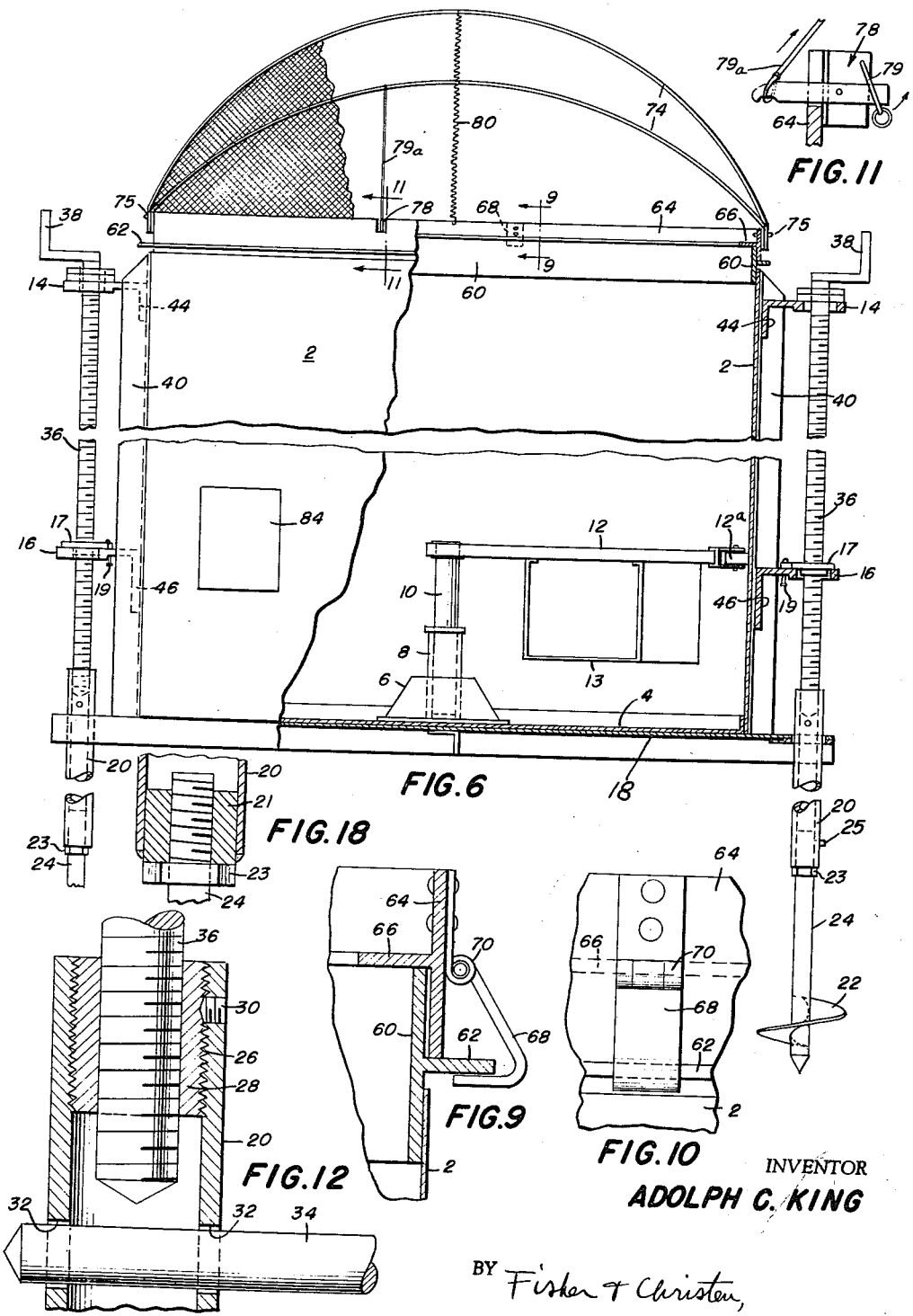

United States Patent Office 3,075,252
Patented Jan. 29, 1963

3,075,252
PORTABLE BLIND FOR HUNTERS AND SOLDIERS
Adolph C. King, % King Industries, McKenzie, Tenn.
Filed Aug. 12, 1957, Ser. No. 677,516
12 Claims. (Cl. 20—2)

This invention is a portable shooting pit or blind for use by hunters of ducks, geese or other water birds, and by soldiers as portable fox holes for military uses in swampy or shallow water areas.

The principal object of the invention is to provide a portable blind or the like which can readily be transported by truck, car or boat trailer, or by towing to a shooting area and readily anchored in place, preferably in relatively shallow water.

The blind comprises a submersible watertight body or tank, provided with brackets carrying hollow vertically extensible internally threaded anchoring posts, which are projected downwardly into the bottom, for holding the tank in place. The lower ends of the anchoring posts are preferably provided with helical screw means or the like, which, when turned manually, screw into the mud and anchor same to the tank. These helical screws are detachable for replacement by larger or smaller helical screws, or for substitution of a corkscrew type of anchor.

After the anchor posts are thus screwed into the mud, jack screws, positioned in brackets on the sides of the tank, are screwed into the upper ends of the hollow, internally threaded anchor posts; when rotated, these jack screws pull the tank down into the water, against the rather substantial upward buoyant effect of the water, until the upper edge of the tank is a little above the level of the water. By rotation of the jack screws, the tank may be lowered as desired, or raised in the event of a rise of water level, as in tidal areas, or in case of rough water.

The tank is also provided with a central pedestal on which is rotatably mounted a seat for the gunner, to rotate in a complete circle.

Below the gunner's seat there is provided one or more compartments for food, ammunition and the like. Heating means for cold weather may be provided, and one or more steps on the outside are used.

Another important object of the invention is to provide a camouflage canopy, which is rotatable in a complete circle about a vertical axis which can be quickly opened by the gunner when the birds or other targets are in shooting range. This canopy is detachably mounted on the upper edge of the tank and comprises several arched ribs, in substantially the shape of an inverted U, covered over with a flexible mesh of cloth or net. The arched ribs have their lower ends pivoted to a movable mounting ring supported by the upper edge of the tank, and when in extended position, conceal the gunner, although the gunner can look out through the mesh to watch for birds or enemy personnel.

The arched hood is provided with torsion or tension retracting spring means and is held in the open or operative position by a simple latch or trigger, upon release of which the spring means quickly opens the hood by pulling the ribs into a horizontal position, thereby enabling the gunner to fire in any direction, either from his rotatable seat or from a standing position.

In a modified form, anchor stakes are driven into the mud and a windlass carried by each anchor stake is used to pull the tank downwardly into the water. These anchor stakes are held by retaining pins in a raised position, clear of the bottom, so that the tank can be readily towed to the desired location.

Further advantages of construction and operation will be described in connection with the accompanying drawings, illustrating the present preferred ways of carrying out the invention.

In the drawings:

FIGS. 1, 2, 3, 4, and 5 are diagrammatic views showing successive stages in the anchoring of the tank.

FIG. 6 is a side elevation, partly in section of the tank and cooperating parts;

FIG. 7 is a plan view of FIG. 6;

FIG. 8 is a side view of the top portion of the blind;

FIG. 9 is an enlarged section on line 9—9 of FIG. 6;

FIG. 10 is an elevation of FIG. 9;

FIG. 11 is a sectional view of a detail, on line 11—11 of FIG. 6;

FIG. 12 is an enlarged vertical section of the top of an anchor post;

FIG. 12A is a side elevation of a modification;

FIG. 13 is a plan view of a detail at the top of FIG. 12A;

FIG. 14 is a section of line 14—14 of FIG. 12A; and

FIG. 15 is a section of line 15—15 of FIG. 12A.

FIG. 16 is a plan view of a detail.

FIG. 17 is section on line 17—17 of FIG. 16.

FIG. 18 is an enlarged vertical cross section of a detail.

FIG. 19 is a fragmentary side view of one of the hoops of FIG. 8.

FIG. 20 is an enlarged cross section on line 20—20 of FIG. 19.

Referring now to these drawings, the invention comprises a submersible tank indicated generally at 2, of metal, plastic, or any suitable material. This tank is preferably in the shape of an open-topped cylinder, having a water-tight bottom 4. Positioned centrally on the bottom 4 is a pedestal 6 provided with a bearing sleeve 8 in which is rotatably mounted a support 10 for a seat 12 for the gunner. This seat is rotatable 360°. The outer edge of seat 12 may be provided with rollers 12a, adapted to bear against the inside of 2, to guide and support the seat. A box-like compartment 13 is provided below the seat 12 for ammunition, food, water etc.

In order to anchor the tank in place in water of a depth, of about 1–5 feet, the tank is provided with an upper outwardly extending bracket 14, with an intermediate apertured alignment guide member 16, a bottom guide channeled member 18, which extends across the bottom of the tank 2, the ends of 18 serving to prevent a lateral movement or rocking of the actuating parts, as will be described.

The apertured alinement guide 16, FIGS. 6, 16 and 17 is provided with a cooperating apertured guide plate 17, flanged to rest on 16 and provided with a smaller aperture 17a; plate 17 is pivoted on a pin 19 to swing into and out of registry with the aperture in 16.

The anchoring means comprises a hollow anchor post 20 passing downwardly through guide 18 and provided with a helical, earth engaging screw 22, secured in the lower end of the post 20 by shaft 24 held by a set screw 25. By loosening set screw 25, post 24 is readily removable for replacement or repair or for substitution of a corkscrew type of helix, instead of 22. The upper end of post 20 is internally threaded at 26 to receive an externally and internally threaded bushing 28, held in place by set screw 30. Post 20 is provided with registering holes 32 to receive a rod 34 for screwing anchor post 20 into the mud. Rod 34 is operated by the hunter in the blind reaching over the side thereof, or by the hunter operating rod 34 from a boat, or from a standing position in water or mud alongside the blind. After the posts are thus anchored, rod 34 is removed.

The internally threaded bushing 28, FIG. 12, can also readily be made by casting it of Babbitt metal around a threaded jig, such casting being anchored in place in the top of the hollow post 20 by spurs projecting radially and outwardly into holes in the top of post 20, the top of 20 being turned inwardly at the top for further anchorage. When the jig is withdrawn, an internally threaded bushing like 28, FIG. 12, is provided.

The upper end of shaft 24, FIGS. 6 and 18, is threaded to engage an internally threaded bushing 21, welded in place in 20, and is held in place therein by a lock nut 23.

As soon as the anchor pipes are screwed into the mud, guide plates 17, FIG. 17, are swung into position of FIG. 17, and the jack screws 36 (which up to this point have been stored in tank 2) are passed downwardly through upper bracket 14 and through the hole 17a in plate 17, to provide a relatively close guide for the jack screws, to permit the screws to rotate readily, but with no lateral movement, to cause the jack screws to keep their alinement as they are screwed into the top of anchor posts 20. The jack screws are then turned by their handles 38 simultaneously or independently to pull the tank downwardly into the water, against the rather considerable upward hydraulic pressure, until the upper edge of the tank is nearly down to the water level.

In order to stiffen the sides of tank 2 and to provide a rigid anchorage for brackets 14 and guides 16 and 17, there is riveted to the outside of tank 2 vertically extending channel members 40; upper bracket 14 and guide 16 are in the form of angle irons, the vertical legs 44 and 46 of which are riveted or welded to the channel member 40.

Briefly to summarize the operation: With the jack screws stored within tank 2, the anchor posts 20 are carried in brackets 14 and 18, FIG. 1, with the mud engaging screws just slightly below the bottom of the tank, the posts being held in this upper position by transverse pins 48 passing through holes 49 in post 20, these pins resting on 16 or 18 as the assembly is carried to its anchorage. These pins are removed, posts dropping to the bottom, FIG. 2, and are screwed into the mud by rods 34, FIG. 3. Then the jack screws 36 are passed downwardly through the guide brackets through holes 17a in plate 17 and into threaded engagement with the anchor posts and handles 38 turned, FIG. 4, thereby to pull the tank 2 downwardly to the desired depth in the water; the line 51 indicates the approximate water level. The lateral stresses on brackets 14 are taken care of by their mounting in vertical channels 40. The depth of submersion is readily controlled by the jack screws. Due to the relatively large water displacement of the tank 2, a strong downward pull is necessary to pull the tank downward into the water, and this is provided by the mechanical advantage of the jack screw 36.

In normal use, the parts just described are in duplicate, 180° apart, but where a larger tank is used it may be desirable to use three or four anchoring posts and a corresponding number of jack screws.

In order to prevent unauthorized removal, handle 38 and bracket 14 may be provided with holes 50 and 52, FIG. 7, which can be brought into registry and through which a securing pin or padlocked chain could be passed.

The Camouflage Hood

In order to screen the installation from the game birds or from enemy soldiers, the top of the tank is provided with a retractible or foldable hood. The top rim of the tank 2 is provided with an annular ring 60, FIG. 9, secured by rivets or welding to the upper edge of tank 2, and having a horizontally extending trackway 62. The support for the hood comprises an annular supporting ring 64, the lower edge of which rests on track 62 and which is provided with an inwardly extending support 66, supported by and movable on the upper edge of ring 60. Ring 64 is provided with angled hooks 68 adapted to engage over the outer edge of track 62. These angled hooks may be hinged, as at 70 for attachment and detachment, spring hinges being preferably used.

The camouflage hood comprises two or more arched ribs or hoops 74, pivoted at 75 at their outer, lower ends to ring 64. These ribs are covered over by and support a reticulated cover or net 73, enabling the gunner to see through it; it may be colored to blend with the surroundings and to it may be attached grass or leaves for additional concealment. The front hoop or rib 74, FIGS. 8, 19, and 20, is preferably U-shaped in cross section, and the front edge of net 73 held in place therein by an elastic, round band or cable 75, of rubber or neoprene, the ends of the band being provided with hooks 77 engaged in apertures in 74 to hold it in place. The other ribs may, if desired, be similar and similar bands or cables used therewith. The hood may be readily rotated as desired by moving ring 64 on the supporting ring 60.

The hood is normally latched in closed position by a simple, quick releasable latch 78, FIG. 11, and a pull ring 79, release of which releases the retaining cord 79a, attached to one of the ribs 74, and is provided with one or more helical springs 80, which upon release of the latch pull the hood open quickly to enable the gunner to fire. In place of springs 80 elastic members like 75, FIGS. 19 and 20, with hooks at each end could be used.

A modified arrangement for anchoring the tank is shown in FIGS. 12A, 13, 14 and 15, in place of the jack screws. In this form, anchor posts, in the form of angle irons 90, are driven into the mud. These posts are provided with mud-gripping anchors 92, pivoted at their lower ends at 94, to fold inwardly as the post goes down, but which pivot outwardly to bite into the mud if raised, thereby anchoring them.

Each anchor post 90 is provided with a windlass 96 having an operating handle 98 and provided with a cable 100 secured at 102 to a bracket 104 carried by the upper part of tank 2. The posts 90 are also provided with a series of holes 105 for receiving a locking pin. Bracket 104 is provided with hinged arms 106 adapted to embrace post 90 and to be secured around 90 by a lock pin 108 passing through the ends of the arms. A lower bracket 104A supports and guides the lower portion of post 90.

In operation, with post 90 driven into the mud, arms 106 are pinned together around 90 and the windlass 96 operated to pull tank 2 down into the water. When far enough down, a lock pin is inserted through one of the holes 105 in 90, just above arms 106, whereby the tank is held submerged to the proper depth.

The outer wall of tank 2 may be provided with one or more steps 84 to enable the gunner readily to step into and out of the tank. The step 84 is in the form of a one piece box welded to the outer wall of 2, the interior of the box registering with a suitable opening in the wall on tank 2, for receiving briquettes or a slow burning fuel for use in cold weather; the box could also be used for ammunition or food.

While the preferred embodiment of the invention has been described in some detail, it should be understood that this disclosure is illustrative rather than restrictive, and that the invention may be carried out in other ways.

I claim as my invention:

1. A portable shooting blind for hunters or fox hole for soldiers, for use in swamps and shallow water, for partial submergence therein, comprising an open topped, water tight tank, bracket means on the outside of said tank, a plurality of anchor posts carried by said brackets and extending downwardly below the level of the bottom of said tank, said anchor posts being provided at their lower ends with means for penetrating and biting into the bottom for thereby anchoring said anchor posts, and manually operated means, cooperating with said anchor posts, operable by a man standing in said tank, for pulling the tank downwardly on the anchor posts, against the upward buoyancy of the water.

2. The combination of claim 1, wherein said manually operable means comprises jack screws carried by said tank and engageable with said anchor posts.

3. The combination of claim 1, wherein said anchor posts are provided with rotatable helical means adapted to bite into the bottom.

4. The combination of claim 1, wherein said manually operable means comprises jack screws carried by the tank and wherein the lower ends of the anchor posts are provided with rotatable helical means adapted to dig into the bottom.

5. A shooting blind for hunters or fox hole for soldiers, for use in water and swamps, comprising an open topped, partially submersible water-tight tank, bottom engaging anchor posts adapted to bite into and thereby become anchored in the bottom, upper and lower brackets carried on the outside of said tank, and means, including manually operated jack screws supported in said brackets and operatively engageable with respective anchor posts, for forcing the tank downwardly into the water against the upward pressure thereof.

6. The combination of claim 5, wherein the outside of the tank is provided with vertically extending stiffening members to which said brackets are secured.

7. The combination of claim 6, wherein the lower ends of the anchor posts are provided with bottom engaging helical means adapted to screw into the bottom.

8. A shooting blind for hunters or fox hole for soldiers, for use in water and swamps, comprising an open topped, partially submersible water-tight tank, said tank having a bottom having a centrally positioned pedestal thereon, a seat for the gunner carried by said pedestal for rotary movement of 360°, a plurality of bottom engaging anchor posts mounted on the outside of said tank and provided with movable means for biting into the bottom for thereby anchoring said posts to the bottom, and manually operated means cooperating with said anchor posts and attached to the tank, for drawing said tank downwardly into the water against the upward hydraulic pressure thereof.

9. A shooting blind for hunters or fox hole for soldiers, for use in water and swamps, comprising a submersible open topped water-tight tank, anchor posts on the outside of the tank, provided with means at the lower ends thereof for biting into the bottom, means, including a windlass, cooperating with the anchor posts and the tank, for pulling the tank downwardly into the water against the upward pressure thereof.

10. The combination of claim 9, wherein said anchor posts are adapted to be driven into the bottom and are provided with pivoted, outwardly movable anchors for resisting upward withdrawal thereof.

11. The combination of claim 9, further including perforated brackets on the outside of the tank, and wherein said anchor posts are provided with a row of vertical holes adapted to receive transverse pins engageable in said perforated brackets for preventing upward movement of said tank.

12. A shooting blind for hunters or fox hole for soldiers, for use in water or swamps, comprising an open topped, partially submersible water-tight tank, anchor means for said tank, adapted to be moved to bite into the bottom for anchoring engagement with the bottom below said tank, bracket means carried by the outside of said tank, power-applying means, cooperating with said bracket means and with the tank, and operatively engaged with said anchor means, for pulling said tank downwardly into the water against the upward hydraulic pressure thereof.

References Cited in the file of this patent

UNITED STATES PATENTS

| | | |
|---|---|---|
| 367,617 | Gruson | Aug. 2, 1887 |
| 413,581 | Timby | Oct. 22, 1889 |
| 766,559 | Webber | Aug. 2, 1904 |
| 858,854 | Broch | July 2, 1907 |
| 1,289,965 | Tichenor | Dec. 31, 1918 |
| 1,437,219 | Berthon | Nov. 28, 1922 |
| 1,461,963 | Bieneck | July 17, 1923 |
| 1,990,804 | Watson | Feb. 12, 1935 |
| 2,190,330 | Martine | Feb. 13, 1940 |
| 2,245,961 | Clay | June 17, 1941 |
| 2,308,743 | Bulkley et al. | Jan. 19, 1943 |
| 2,400,385 | Blaylock | May 14, 1946 |
| 2,621,485 | Ross | Dec. 16, 1952 |
| 2,739,833 | Schenkel | Mar. 27, 1956 |
| 2,771,747 | Rechtin | Nov. 27, 1956 |
| 2,777,669 | Willis | Jan. 15, 1957 |
| 2,846,851 | Pelham | Aug. 21, 1958 |
| 2,877,629 | DeLong | Mar. 17, 1959 |